United States Patent
Hirai et al.

(10) Patent No.: US 12,027,103 B2
(45) Date of Patent: Jul. 2, 2024

(54) DISPLAY APPARATUS AND VIDEO DISPLAY METHOD

(71) Applicant: SONY GROUP CORPORATION, Tokyo (JP)

(72) Inventors: Noriyuki Hirai, Tokyo (JP); Hiroshi Tobita, Tokyo (JP); Nobutake Iwase, Tokyo (JP); Shutaro Kurokawa, Tokyo (JP); Kotaro Shima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/757,677

(22) PCT Filed: Dec. 15, 2020

(86) PCT No.: PCT/JP2020/046739
§ 371 (c)(1),
(2) Date: Jun. 17, 2022

(87) PCT Pub. No.: WO2021/131901
PCT Pub. Date: Jul. 1, 2021

(65) Prior Publication Data
US 2023/0015454 A1     Jan. 19, 2023

(30) Foreign Application Priority Data
Dec. 25, 2019    (JP) .................... 2019-233686

(51) Int. Cl.
*G09G 3/32*     (2016.01)

(52) U.S. Cl.
CPC ......... *G09G 3/32* (2013.01); *G09G 2300/026* (2013.01); *G09G 2300/043* (2013.01); *G09G 2320/0233* (2013.01)

(58) Field of Classification Search
CPC ............... G06F 3/1423; G06F 3/1446; G09G 3/32–3291; G09G 2300/026;
(Continued)

(56) References Cited

U.S. PATENT DOCUMENTS

| | | | |
|---|---|---|---|
| 9,135,863 B2* | 9/2015 | Duerksen | G09G 3/035 |
| 2016/0093244 A1* | 3/2016 | Kazmierski | G06F 3/1446 |
| | | | 345/1.3 |

(Continued)

FOREIGN PATENT DOCUMENTS

| | | |
|---|---|---|
| CN | 108922900 A | 11/2018 |
| JP | 2013-117553 A | 6/2013 |

(Continued)

OTHER PUBLICATIONS

International Search Report and Written Opinion of PCT Application No. PCT/JP2020/046739, dated Feb. 22, 2021, 11 pages of ISRWO.

*Primary Examiner* — Nathan Danielsen
(74) *Attorney, Agent, or Firm* — CHIP LAW GROUP

(57) ABSTRACT

A display apparatus including a screen portion in which unit panels in which a plurality of pixels formed from light-emitting elements is disposed are arranged, in which a first pixel-to-pixel pitch that is a space between two outer end pixels adjacent to each other across outer peripheries of the unit panels is equal to or larger than a second pixel-to-pixel pitch that is a space between each of the outer end pixels and a pixel adjacent to the outer end pixel, and the pixel-to-pixel pitches adjacent to each other in the array of the pixel-to-pixel pitches in a direction in which the first and second pixel-to-pixel pitches are arranged in the unit panel are set to be P(in)≤P(out) where P(in) denotes the pixel-to-pixel
(Continued)

pitch located on a central side of the unit panel and P(out) denotes the pixel-to-pixel pitch located on an outer peripheral side of the unit panel.

11 Claims, 6 Drawing Sheets

(58) Field of Classification Search
CPC ... G09G 2300/0421; G09G 2300/0426; G09G 2300/043; G09G 2300/0465; G09G 2310/0232; G09G 2310/0243; G09G 2310/0264; G09G 2310/0289; G09G 2310/06; G09G 2310/08; G09G 2320/0233; G09G 2320/04; G09G 2320/0626; G09G 2320/0686; G09G 2320/0693; G09G 2340/0407–0421; G09G 2340/14; G09G 2340/145
See application file for complete search history.

(56) References Cited

U.S. PATENT DOCUMENTS

| | | | |
|---|---|---|---|
| 2018/0122288 A1* | 5/2018 | Huang | G06F 3/1446 |
| 2020/0193943 A1* | 6/2020 | Iversen | G06F 3/1446 |
| 2021/0041718 A1* | 2/2021 | Balogh | G09G 3/32 |

FOREIGN PATENT DOCUMENTS

| | | |
|---|---|---|
| JP | 2019-074732 A | 5/2019 |
| JP | 2019-075528 A | 5/2019 |
| KR | 10-2010-0115109 A | 10/2010 |
| WO | 2008/117393 A1 | 10/2008 |
| WO | 2013/051063 A1 | 4/2013 |

* cited by examiner

DISPLAY APPARATUS AND VIDEO DISPLAY METHOD

CROSS REFERENCE TO RELATED APPLICATIONS

This application is a U.S. National Phase of International Patent Application No. PCT/JP2020/046739 filed on Dec. 15, 2020, which claims priority benefit of Japanese Patent Application No. JP 2019-233686 filed in the Japan Patent Office on Dec. 25, 2019. Each of the above-referenced applications is hereby incorporated herein by reference in its entirety.

TECHNICAL FIELD

The present disclosure relates to a display apparatus and a video display method.

BACKGROUND ART

A tiling display is known as a large-screen display apparatus. In the tiling display, unit panels in which a plurality of pixels is disposed are combined. In the tiling display, it is desirable to make seams (joints) between unit panels adjacent to each other inconspicuous during the use of the display apparatus in order to maintain its display quality.

For example, as in a technology of Patent Literature 1, there has been proposed a technology in which joints are made inconspicuous during the use of the display apparatus by deviating X and Y coordinates of a pixel adjacent to an outer periphery of a display panel, which corresponds to the unit panel, and setting a distance between two pixels adjacent to an outer periphery of a display unit and the outer periphery and a space between two pixels proximate to each other in the display unit to take random values under a predetermined condition.

CITATION LIST

Patent Literature

Patent Literature 1: Japanese Patent Application Laid-open No. 2010-282009

DISCLOSURE OF INVENTION

Technical Problem

In the tiling display, for the purpose of ensuring a cut margin during the manufacture of unit panels and ensuring a margin for the lay-out of wirings to be connected to pixels, it is desirable that a certain length be ensured for the distance between the pixel adjacent to the outer periphery of the unit panel and the outer periphery of the unit panel. Moreover, it is desirable that a certain length be ensured for the joint width (gap) for the purpose of preventing the collision of the unit panels adjacent to each other. In the technology described in Patent Literature 1, there is room for improvement in view of the points of ensuring the gap and ensuring the cut margin during the manufacture of unit panels and the margin for the lay-out of wirings to be connected to pixels.

The present disclosure has one of the objectives to provide novel and useful display apparatus and video display method, which have been made in view of the above-mentioned points.

Solution to Problem

The present disclosure is a display apparatus including a screen portion in which unit panels in which a plurality of pixels formed from light-emitting elements is disposed are arranged, in which a first pixel-to-pixel pitch that is a space between two outer end pixels adjacent to each other across outer peripheries of the unit panels is equal to or larger than a second pixel-to-pixel pitch that is a space between each of the outer end pixels in each of the unit panels and a pixel adjacent to the outer end pixel, and the pixel-to-pixel pitches adjacent to each other in the array of the pixel-to-pixel pitches in a direction in which the first pixel-to-pixel pitch and the second pixel-to-pixel pitch are arranged in the unit panel are set to be P(in)≤P(out) where P(in) denotes the pixel-to-pixel pitch located on a central side of the unit panel and P(out) denotes the pixel-to-pixel pitch located on an outer peripheral side of the unit panel.

Moreover, the present disclosure is a video display method in a display apparatus including a screen portion in which unit panels in which a plurality of pixels formed from light-emitting elements is disposed are arranged, in which a first pixel-to-pixel pitch that is a space between two outer end pixels adjacent to each other across outer peripheries of the unit panels is equal to or larger than a second pixel-to-pixel pitch that is a space between each of the outer end pixels in each of the unit panels and a pixel adjacent to the outer end pixel, and the pixel-to-pixel pitches adjacent to each other in the array of the pixel-to-pixel pitches in a direction in which the first pixel-to-pixel pitch and the second pixel-to-pixel pitch are arranged in the unit panel are set to be P(in)<P(out) where P(in) denotes the pixel-to-pixel pitch located on a central side of the unit panel and P(out) denotes the pixel-to-pixel pitch located on an outer peripheral side of the unit panel, the method including:
  correcting, by a video distortion correction processing unit, a video distortion, the video distortion being generated in an input video signal due to setting the pixel-to-pixel pitches to be P(in)<P(out); and
  changing, by a luminance correction processing unit, luminance of the outer end pixels provided in the unit panels.

MODE(S) FOR CARRYING OUT THE INVENTION

Hereinafter, an embodiment and the like according to the present disclosure will be described with reference to the drawings. It should be noted that the descriptions will be given in the following order. Moreover, in the present specification and the drawings, configurations having substantially the same functional configurations will be denoted by the same reference signs and the duplicate descriptions will be omitted.

Embodiment

1. Display Apparatus
2. Video Display Method in Display Apparatus

Modified Example

The following descriptions are favorable specific examples of the present disclosure and the contents of the present disclosure are not limited thereto.

EMBODIMENT

1. Display Apparatus

Figure 1A:
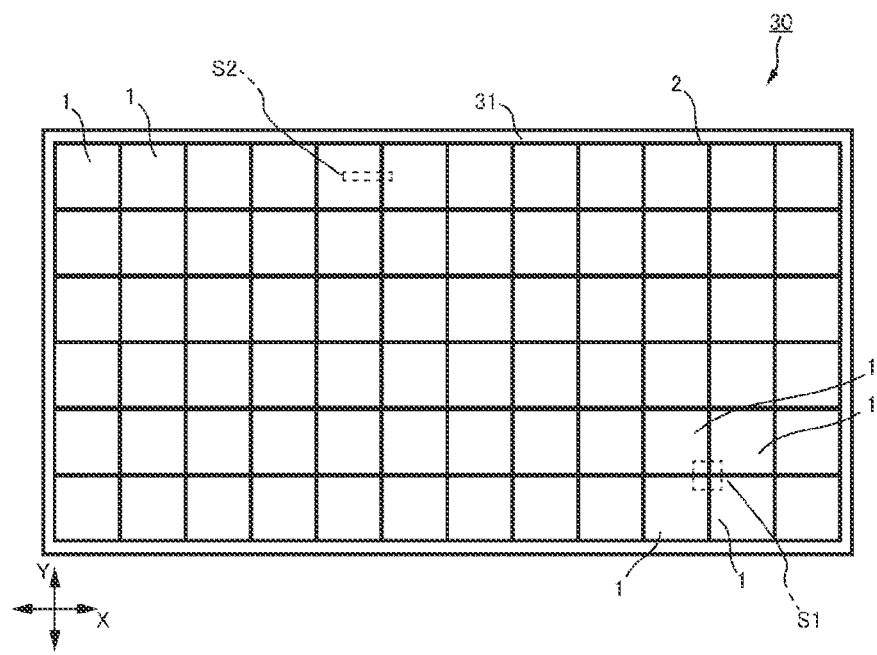
FIG. 1A is a plan view showing a schematic configuration regarding an example of a display apparatus according to an embodiment.
Figure 1B:
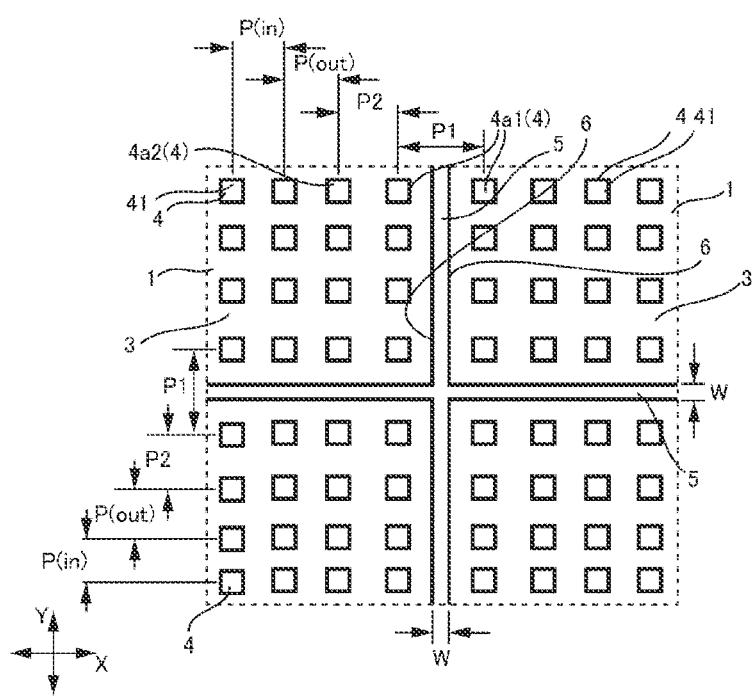
FIG. 1B a schematic partial enlarged diagram for describing a state in which the portion of a region S1 surrounded with the broken line of FIG. 1A is enlarged.

FIGS. 1A and 1B are diagrams showing a schematic configuration of a display apparatus according to an embodiment of the present disclosure and FIGS. 1A and 1B are diagrams for describing a state in which unit panels are arranged. A display apparatus 30 has a screen portion 2 in which a plurality of unit panels 1 is arranged. The unit panel 1 has a structure in which a plurality of pixels 4 is disposed on a panel substrate 3.

Screen portion 2

The screen portion 2 forms the screen of the display apparatus 30 in a state in which the unit panels 1 are arranged. The screen portion 2 includes, for example, the plurality of unit panels 1 on a base 31 attached using a fixing member such as an adhesive and screw members as appropriate. Although the arrangement pattern of the unit panels 1 is not particularly limited, it is favorable that for various purposes such as the purpose for precisely setting the width of a joint 5 (joint width W), the unit panels 1 are disposed to be combined in a tile form, and it is more favorable that in the screen portion 2 in the example of the display apparatus 30 shown in FIGS. 1A and 1B, the unit panels 1 are arranged in a matrix form in an X-axis direction and a Y-axis direction orthogonal to each other. Moreover, in the example of FIGS. 1A and 1B, a unit panel 1 and a unit panel 1 adjacent to that unit panel 1 in the X-axis direction are arranged so that the positions of their outer end pixels 4a1 and 4a1 in the Y-axis direction are aligned. A unit panel 1 and a unit panel 1 adjacent to that unit panel 1 in the Y-axis direction are arranged so that the positions of their outer end pixels 4a1 and 4a1 in the X-axis direction are aligned.

It should be noted that although the unit panels 1 are arranged and the screen portion 2 is configured in the above description, the configuration of the screen portion 2 is not limited thereto. For example, a predetermined number of unit panels 1 disposed in a matrix form may be formed as a panel unit in advance and the screen portion 2 may be formed in a state in which a plurality of panel units is arranged. In this case, the screen portion 2 can be realized by, for example, providing the panel units on the base by using a fixing member such as an adhesive and screw members as described above as appropriate. The arrangement patterns, dimensions, and outer shapes of pixels 4 formed in each of the plurality of unit panels 1 that constitutes the screen portion 2 may be the same as each other or may be different from each other. However, it is favorable that they are the same as each other, for example, for the purpose of precisely defining the joint width W.

Pixels 4

In the unit panels 1 in the example of FIG. 1B, the pixels 4 are disposed in a state in which they are arrayed in a matrix form in the X-axis direction and the Y-axis direction orthogonal to each other as in the example of FIG. 1A. Since the plurality of pixels 4 is disposed with regularity in the unit panels 1, video distortion correction processing and luminance correction processing to be described later can be more precisely realized. The arrangement number of pixels 4 to be disposed on one unit panel 1 is not particularly limited, and the number determined in accordance with the design of the unit panels 1 may be employed. It should be noted that in the example of FIGS. 1A and 1B, also as the arrangement of the pixels 4 is viewed as the entire screen portion 2, the pixels are disposed in a state in which they are arrayed in a matrix form in the X-axis direction and the Y-axis direction orthogonal to each other.

The pixels 4 are formed including light-emitting elements 41. Specifically, the pixels 4 are formed by disposing the light-emitting elements 41 at predetermined positions on the panel substrate 3. The light-emitting elements 41 are connected to an IC circuit or the like for controlling the light-emitting states. Although the kinds of the light-emitting elements 41 are not particularly limited, light-emitting diodes (LEDs) are favorably used in a tiling display. As a light-emitting diode that forms one pixel, a mono-color light-emitting diode may be disposed, a bi-color light-emitting diode (bi-color LED) may be disposed, or a tri-color light-emitting diode may be disposed. As the tri-color light-emitting diode, a full-color LED can be exemplified. The full-color LED is LEDs having three colors such as red, green, and blue housed in one casing.

Space between Pixels 4

In the display apparatus 30, a space between two outer end pixels 4a1 and 4a1 (pixel-to-pixel pitch (first pixel-to-pixel pitch P1)) adjacent to each other across outer peripheries 6 of the unit panels 1 is equal to or larger than a space (pixel-to-pixel pitch (second pixel-to-pixel pitch P2)) between each of the outer end pixels 4a1 and a pixel 4a2 adjacent to that outer end pixel 4a1 in each unit panel 1.

Figure 2:
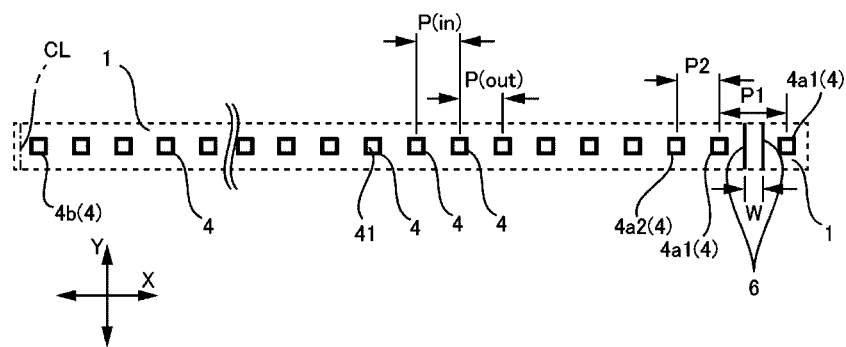
FIG. 2 is a schematic partial enlarged diagram for schematically showing a state in which the portion of a region S2 surrounded with the broken line of FIG. 1A is enlarged regarding an example of the display apparatus according to the embodiment.

In the example of FIG. 2, in each of rows of the pixels 4 arranged in the X-axis direction, the first pixel-to-pixel pitch P1 is equal to or larger than the second pixel-to-pixel pitch P2. It should be noted that it is favorable that the first pixel-to-pixel pitch P1 is equal to or larger than the second pixel-to-pixel pitch P2 not only in each of the rows of the pixels 4 arranged in the X-axis direction but also in each of the rows of the pixels 4 arranged in the Y-axis direction.

Since the first pixel-to-pixel pitch P1 is ensured in accordance with the display apparatus 30, it is possible to make the joints inconspicuous during the use of the display apparatus while ensuring the joint width W that is a clearance distance between the unit panels 1 and 1 adjacent to each other, ensuring the cut margin during the manufacture of unit panels, and ensuring the margin for the lay-out of wirings to be connected to pixels.

In the display apparatus 30, an array of spaces between the pixels 4 (pixel-to-pixel pitches) adjacent to each other in the row of the pixels 4 is defined to satisfy the following condition A. In the example of FIG. 2, the array of the pixel-to-pixel pitches in the row of the pixels 4 arranged in the X-axis direction is defined in a state in which it has regulations according to the predetermined condition A to be described later. Here, as exemplified in FIGS. 2, 3, 4A, and 4B, the array of the pixel-to-pixel pitches refers to a row of pixel-to-pixel pitches Px1, . . . , Pxn-1, Pxn, . . . (where n is a positive integer equal to or larger than 2) arranged in order in a direction in which the row of the pixels 4 extends.

Condition A: pixel-to-pixel pitches adjacent to each other in an array of pixel-to-pixel pitches defined in the row of the pixels 4 in a direction in which the first pixel-to-pixel pitch P1 and the second pixel-to-pixel pitch P2 are arranged in the unit panel are P(in)≤P(out) where P(in) denotes a pixel-to-pixel pitch located on the side of a center portion (in FIGS. 2, 3, 4A, and 4B, a center portion CL shown as the long dashed short dashed line) of the unit panel 1 and P(out) denotes a pixel-to-pixel pitch located on the side of the outer periphery 6 of the unit panel 1.

In the example of FIG. 2, the pixels 4 are disposed to satisfy the following condition A-1 in the condition A.

Condition A-1: the relationship between P(in) and P(out) in the condition A is P(in)=P(out).

In the example of FIG. 2, the direction in which the first pixel-to-pixel pitch and the second pixel-to-pixel pitch are arranged in the unit panel 1 is identical to the X-axis direction and the array of the pixel-to-pixel pitches respectively defined with respect to the row of the pixels 4 in this X-axis direction is disposed to satisfy the condition A-1.

Figure 3:
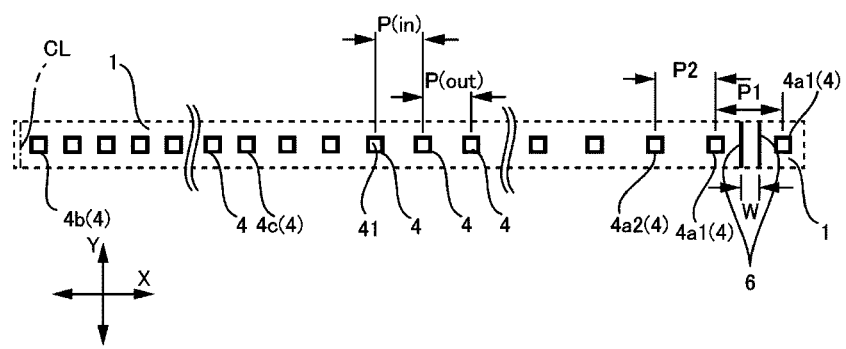
FIG. 3 is a diagram corresponding to a schematic partial enlarged diagram for schematically showing a state in which the portion of the region S2 surrounded with the broken line of FIG. 1A is enlarged regarding an example of the display apparatus according to the embodiment.

In the example of FIG. 3, in the array of the pixel-to-pixel pitches respectively defined with respect to the row of the pixels 4 in the direction in which the first pixel-to-pixel pitch and the second pixel-to-pixel pitch are arranged in the unit panel 1, a portion of the array of the pixel-to-pixel pitches satisfies the condition A-1 and the other portion satisfies the following condition A-2.

Condition A-2: the relationship between P(in) and P(out) in the condition A is P(in)<P(out).

In the example of FIG. 3, the direction in which the first pixel-to-pixel pitch and the second pixel-to-pixel pitch are arranged in the unit panel is identical to the X-axis direction, and pixel-to-pixel pitches defined with respect to a row of the pixels 4 from a pixel 4b(4) located on the side of the center portion CL of the unit panel 1 in that unit panel 1 to a pixel 4c at a position spaced away from the center portion CL toward the outer periphery 6 by a predetermined distance, in the row of the pixels 4 arranged in this X-axis direction, satisfies the condition A-1. Further, pixel-to-pixel pitches defined with respect to a row of the pixels 4 from that pixel 4c to the outer end pixel 4a1 in the direction from the center portion CL toward the outer periphery 6 of the single unit panel 1 in that unit panel 1, in the row of the pixels 4 arranged in the X-axis direction, satisfies the condition A-2. That is, in the example of FIG. 3, the array of the pixel-to-pixel pitches defined by some pixels 4 of the row of the pixels arranged in the X-axis direction satisfies the condition A-1 and the array of the pixel-to-pixel pitches defined by the other pixels 4 in the same row as the row of those pixels satisfies the condition A-2. In this case, in the display apparatus 30, a space between two pixels 4 adjacent to each other is gradually prolonged in the direction from the predetermined inner position of the unit panel 1 toward the outer periphery 6 and a change in the pixel-to-pixel pitches adjacent to each other in the direction from the center portion CL of the unit panel 1 toward the outer periphery 6 is slower. Accordingly, it is unlikely that dark lines are seen at the portions of the joints 5 during the use of the display apparatus 30, and it is possible to more effectively make the joints 5 inconspicuous. It should be noted that in a case where the portion of the array of the pixel-to-pixel pitches satisfies the condition A-2 as in the example of FIG. 3, the amount of change in the pixel-to-pixel pitches adjacent to each other with respect to the portion of the array of the pixel-to-pixel pitches, which satisfies the condition A-2, may be various as in the example of FIG. 4A or may be constant as in the example of FIG. 4B, which will be described later.

Figure 4A:
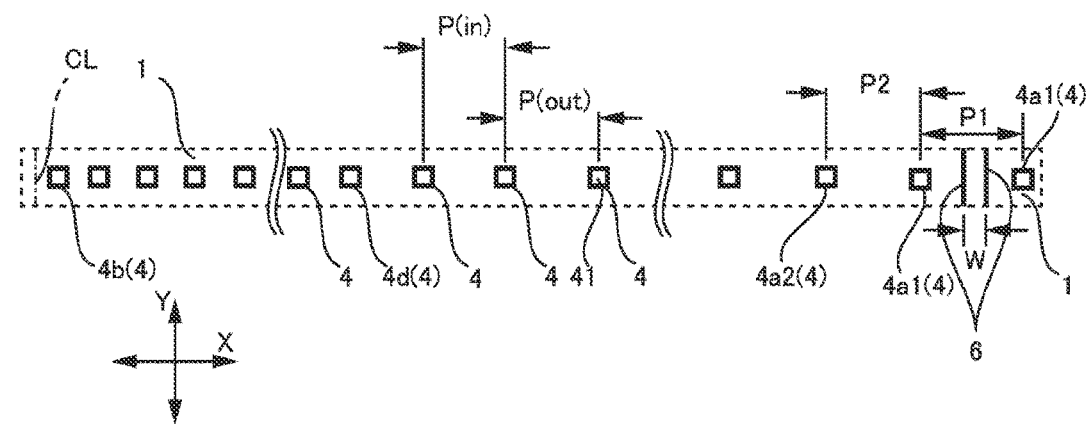
FIGS. 4A and 4B are both diagrams corresponding to a schematic partial enlarged diagram for schematically showing a state in which the portion of the region S2 surrounded with the broken line of FIG. 1A is enlarged regarding an example of the display apparatus according to the embodiment.
Figure 4B:
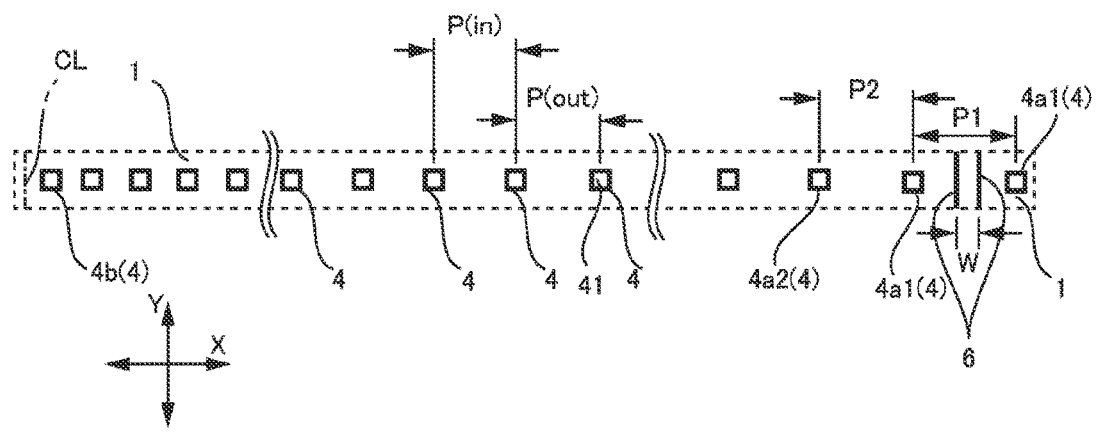

In the example of FIG. 4A or 4B, the direction in which the first pixel-to-pixel pitch P1 and the second pixel-to-pixel pitch P2 are arranged in the unit panel 1 is identical to the X-axis direction, and the array of the pixel-to-pixel pitches defined in the row constituted by the pixels from the pixel 4b proximate to the center portion CL of the unit panel 1 in that unit panel 1 to the outer end pixel 4a1 in the direction toward the outer periphery 6 in the direction in which that row of the pixels 4 is arranged, in the row of the pixels 4 arranged in this X-axis direction, satisfies the condition A-2.

In the example of FIG. 4A, the amount of change in the pixel-to-pixel pitches adjacent to each other in the row of the pixels 4 is various. A change (P(out)−P(in)) in the pixel-to-pixel pitches adjacent to each other in the portion of the array of pixel-to-pixel pitches defined with respect to the row of the pixels 4 from a pixel 4b(4) located on the side of the center portion CL of the unit panel 1 in that unit panel 1 to a pixel 4d at a position spaced away from the center portion CL by a predetermined distance in the direction toward the outer periphery 6 is denoted by Q1. Moreover, a change (P(out)−P(in)) in the pixel-to-pixel pitches adjacent to each other in the portion of the array of pixel-to-pixel pitches defined with respect to the row of the pixels 4 from the pixel 4d to the outer end pixel 4a1 in the direction toward the outer periphery 6 from the center portion CL of the single unit panel 1 in that unit panel 1 is denoted by Q2. In the example of FIGS. 4A, Q1 and Q2 take different values.

Moreover, in the example of FIG. 4B, the change in the pixel-to-pixel pitches adjacent to each other in the array of pixel-to-pixel pitches defined with respect to the row of the pixels 4 from the pixel 4b(4) located on the side of the center portion CL of the unit panel 1 in that unit panel 1 to the outer end pixel 4a1 in the direction toward the outer periphery 6 is constant.

In such a display apparatus 30, since the space between the two pixels 4 adjacent to each other is gradually prolonged in the outward direction from the central position of the unit panel and the change in the space between the pixels adjacent to each other in the direction toward the outer periphery from the center of the unit panel is slower, it is possible to more effectively make the joints inconspicuous during the use of the display apparatus 30.

It should be noted that although the array of the pixel-to-pixel pitches that satisfies the condition A-2 may have two kinds of values as the difference between P(in) and P(out) as described above with respect to FIG. 4A or may have three or more kinds of values, it is favorable that the difference between P(in) and P(out) is set to be constant as in the example shown in FIG. 4B. The same applies to a case where the array of the pixel-to-pixel pitches that satisfies the condition A-2 is partial as in the example of FIG. 3. In a case where the difference between P(in) and P(out) is set to be constant in the array of the pixel-to-pixel pitches, the space between the pixels adjacent to each other takes a value that increases by a constant length in the direction toward the outer periphery 6 from the position of the center portion CL of the unit panel 1 in the display apparatus 30. Further, in such a case, it is much more unlikely that the change in the pixel-to-pixel pitches adjacent to each other is visually recognized, and it is possible to more effectively make the joints inconspicuous during the use of the display apparatus 30.

In the display apparatus 30, the above-mentioned condition A (condition A-1 or condition A-2) is not limited to the array of the pixel-to-pixel pitches defined in the row of the pixels 4 arranged in the X-axis direction, and it is favorable that it is also satisfied with respect to an array of pixel-to-pixel pitches defined in the row of the pixels 4 arranged in the Y-axis direction. In such a display apparatus 30, since the condition A-1 or the condition A-2 is satisfied with respect to rows of pixels 4 arranged in the axial directions of both the X-axis direction and the Y-axis direction, the space between two pixels 4 and 4 adjacent to each other is gradually prolonged in the direction toward the outer periphery 6 from the position of the center portion CL of the unit panel 1, and it is possible to more effectively make the joints 5 inconspicuous during the use of the display apparatus 30.

Anti-Glare Film

Figure 5A:
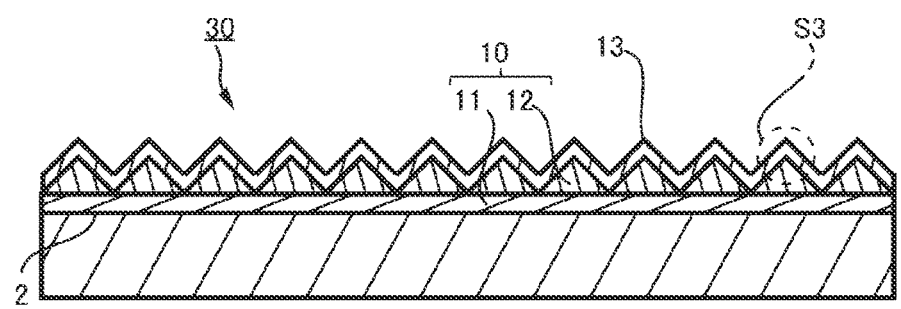
FIG. 5A is a cross-sectional view showing a schematic configuration of an example in a case where an anti-reflection film is laid on the surface of a display panel of the display apparatus.

It is favorable that the display apparatus 30 has an anti-glare film (AG film) 10 provided on a surface side of the surfaces of the unit panels 1 as shown in FIG. 5A, the surface side being the surface of the screen portion 2. The AG film 10 is a film material having minute irregularities formed in a predetermined pattern on the surface. The AG film 10 is manufactured by, for example, forming an anti-glare layer 12 having minute irregularities on a film base material 11 that is the base. Since the display apparatus 30 includes the AG film 10, it is possible to further improve the property of preventing the reflection of external light on the surface of the screen portion 2 and to appropriately blur a video displayed on the screen portion 2. It should be noted that in FIG. 5A, the illustration of the pixels 4 is omitted for the sake of description.

Anti-Reflection Film

Figure 5B:
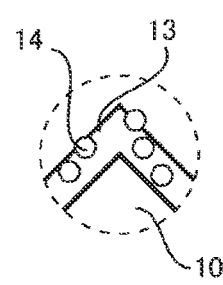
FIG. 5B is a schematic partial enlarged diagram for describing a state in which the portion of a region S3 surrounded with the broken line of FIG. 5A is enlarged.

It is favorable that the display apparatus 30 has an anti-reflection film 13 stacked on the surface side of the AG film 10 as shown in FIG. 5B, the anti-reflection film 13 containing particles 14. Since the anti-reflection film 13 is stacked on the surface of the AG film 10, it becomes easy to further improve the black display performance of the display apparatus 30 and more accurately display a video based on a video signal on the screen portion 2. The anti-reflection film 13 can be formed by coating the surface of the AG film 10 with a composition for forming the anti-reflection film.

It should be noted that in a case where the AG film 10 and the anti-reflection film 13 are stacked in the display apparatus 30, it is favorable that the anti-reflection film 13 is stacked in order to satisfy the following condition 1 or 2.

Condition 1: when a power spectral density (PSD) value in a case where the spatial frequency of the uppermost surface on the side of the screen portion 2 in the display apparatus 30 is $1\times10^{-1}$ (/μm), $2\times10^{-1}$ (/μm), or $4\times10^{-1}$ (/μm) is measured in the state in which the screen portion 2 of the display apparatus 30 is provided with the AG film 10 and the anti-reflection film 13 is not stacked (state before the anti-reflection film 13 is stacked) and in the state in which the screen portion 2 of the display apparatus 30 is provided with the AG film 10 and the anti-reflection film 13 is formed (state after the anti-reflection film 13 is stacked), the ratio of the PSD value measured in the state after the anti-reflection film 13 is stacked to the PSD value measured in the state before the anti-reflection film 13 is stacked is 0.1 or more and 4.9 or less.

Condition 2: when the PSD value in a case where the spatial frequency of the uppermost surface on the side of the screen portion 2 in the display apparatus 30 is $2\times10^{-2}$ (/μm) or $4\times10^{-2}$ (/μm) is measured in the state before the anti-reflection film 13 is stacked and in the state after the anti-reflection film 13 is stacked, the ratio of the PSD value measured in the state after the anti-reflection film 13 is stacked to the PSD value measured in the state before the anti-reflection film 13 is stacked is 0.75 or less.

The PSD values in the predetermined spatial frequencies described in the condition 1 or 2 are determined in the following manner. By measuring a profile of the uppermost surface on the side of the screen portion 2 in each state of the state before the anti-reflection film 13 is stacked and the state after the anti-reflection film 13 is stacked and performing Fourier transform on it, a graph for determining the relationship between the spatial frequency and the PSD can be obtained. On the basis of that graph, the PSD values in the predetermined spatial frequencies are determined.

When the above-mentioned condition 1 or 2 is satisfied in a case where the AG film 10 and the anti-reflection film 13 are stacked in the display apparatus 30, it is possible to further improve the black display performance and to more accurately display a video based on a video signal on the screen.

For example, when the anti-reflection film 13 contains a predetermined amount of minute particles 14 having a predetermined average particle diameter for the purpose of, for example, adjusting to a suitable refractive index, the above-mentioned condition 1 or 2 can be specifically realized. Acrylic particles or the like can be exemplified as the particles 14. Although the particle diameter of the particles 14 is not particularly limited, it is favorably 1 nm or more and 500 nm or less for the purpose of efficiently obtaining the anti-reflection film 13 that satisfies the condition 1 or 2. Moreover, the anti-reflection film 13 may have a single layer or may have a plurality of layers that is two or more layers.

Video Display Method in Display Apparatus

Internal Configuration Example of Display Apparatus

In the display apparatus 30, a video based on a video signal for display is displayed on the screen portion 2. The video includes a still image, a moving image, and the like, and the moving image may be a moving image with sound or may be a moving image without sound.

Figure 6:
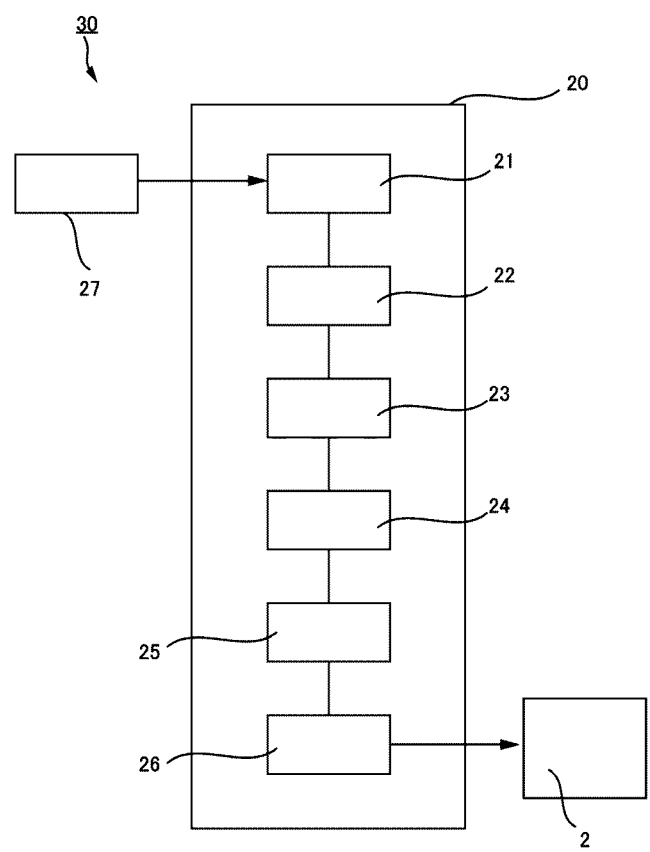
FIG. 6 is a block diagram for describing an internal configuration example of a display configuration according to the embodiment.

FIG. 6 is a block diagram showing an internal configuration example of the display apparatus 30. The display apparatus 30 includes, beside the screen portion 2, a display control unit 20 and a video signal input unit 27. The video signal input unit 27 is an interface in which a video signal is input. The display control unit 20 includes an input frame buffer 21, a video distortion correction processing unit 22, an output frame buffer 23, a linear and gamma correction unit 24, a luminance correction processing unit 25, and a luminance and chromaticity non-uniformity correction unit 26. The display control unit 20 is constituted by, for example, an IC circuit or the like.

The input frame buffer 21 temporarily stores input video signals input via the video signal input unit 27 on a frame-by-frame basis.

The video distortion correction processing unit 22 performs video distortion correction processing of correcting video distortions generated in the input video signals due to setting the pixel-to-pixel pitches to be P(in)<P(out). It should be noted that details of the video distortion correction processing will be described later.

The output frame buffer 23 temporarily stores the video signal subjected to the video distortion correction processing.

The linear and gamma correction unit 24 performs linear correction processing and gamma correction processing on the video signal stored in the output frame buffer 23. Well-known processing can be applied as the linear correction processing and the gamma correction processing.

The luminance correction processing unit 25 performs luminance correction processing on the video signal subjected to the linear correction processing and the gamma correction processing. It should be noted that specific details of the luminance correction processing will be described later.

The luminance and chromaticity non-uniformity correction unit 26 performs processing of correcting the non-uniformity of the luminance and the non-uniformity of the chromaticity on the video signal subjected to the luminance correction processing. By performing such processing, a video (output video signal) displayed on the screen portion 2 is generated.

Video Distortion Correction Processing

Subsequently, an example of the video distortion correction processing performed by the video distortion correction processing unit 22 will be described.

Figure 7A:
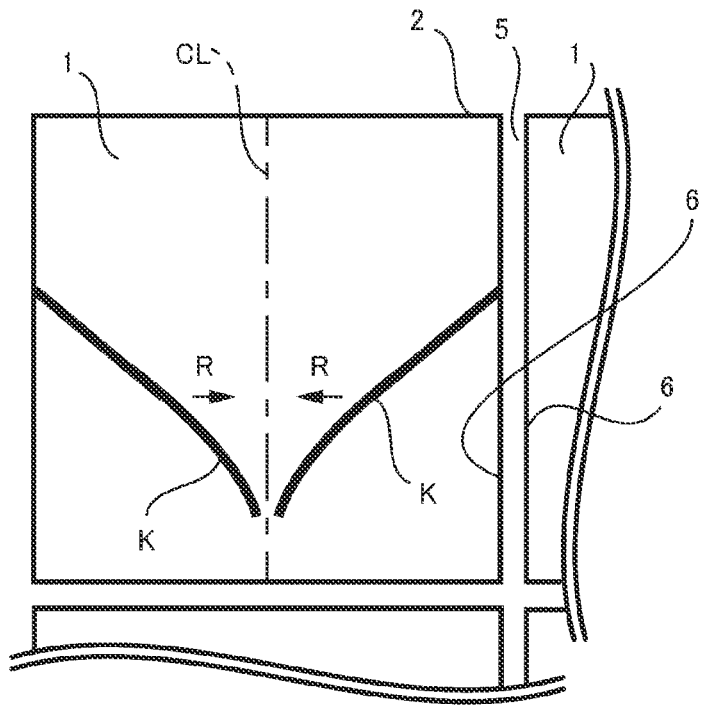
FIGS. 7A and 7B are diagrams to be referred to when describing an example of video distortion correction processing.
Figure 7B:
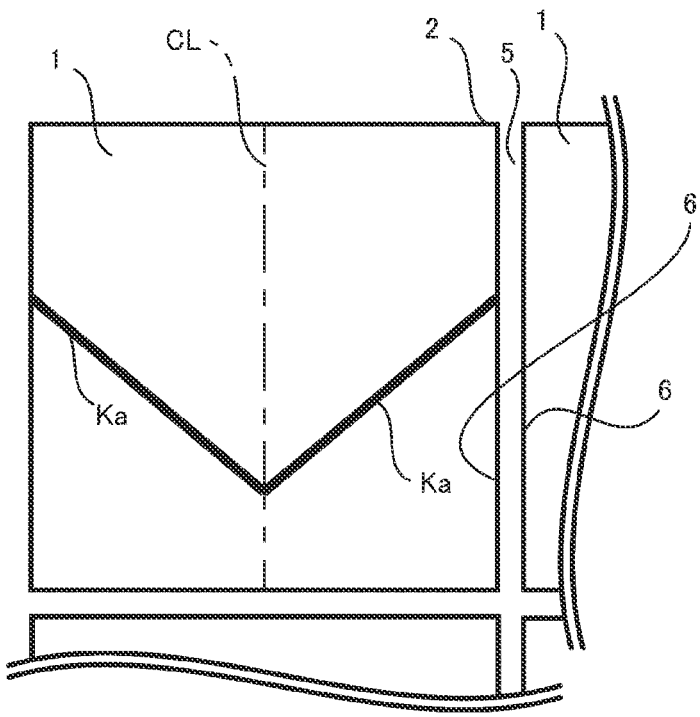

In general, input video signals externally input assume that the pixel-to-pixel pitches adjacent to each other all take a constant value. Therefore, for example, in the screen portion 2 of the display apparatus, in a case where the pixel-to-pixel pitches do not all take the constant value (e.g., in a case where the pixel-to-pixel pitches are larger toward the outer periphery 6 from the vicinity of the center portion CL of the unit panel 1), depending on the contents of the video, there is a possibility that the video (shown as the lines Ka in FIG. 7A) that should be displayed as shown in FIG. 7A, an input video displayed on the screen portion 2, is, as shown in FIG. 7B, a video having video distortions (shown as the lines K in FIG. 7B) at the vicinity of the center portion CL. The video distortion correction processing of correcting such video distortions is performed by the video distortion correction processing unit 22.

The video distortion correction processing unit 22 corrects the video distortions in accordance with the difference between P(in) and P(out), for example. Specifically, the video distortion correction processing unit 22 corrects (converts) portions of the video signal corresponding to video portions that can have distortions into a signal corresponding to positions moved in directions (in the example of FIG. 7B, the directions toward the center portion CL (arrow R directions)) opposite to the direction in which the pixel-to-pixel pitches are larger. In other words, an arithmetic operation using characteristics opposite to the characteristics of the video distortions is performed on the input video signals. By such video distortion correction processing, it is possible to much more effectively make the portions corresponding to the joints 5 inconspicuous while correcting minute distortions of the video with respect to a video displayed on the screen portion of the display apparatus 30.

In particular, in a case where the array of the pixel-to-pixel pitches satisfies the condition A-2 in the display apparatus 30, it is favorable that the video signal for display that forms the video displayed on the screen portion 2 of the display apparatus 30 is a video signal subjected to the video distortion correction processing.

Luminance Correction Processing

Subsequently, the luminance correction processing performed by the luminance correction processing unit 25 will be described. The luminance correction processing is processing of adjusting the luminance of each of the light-emitting elements 41, which forms each of the pixels 4 of the screen portion 2.

The luminance correction processing unit 25 corrects the luminance of the outer end pixels by suitably setting driving signals for the light-emitting elements of at least the outer end pixels 4a1, out of the input video signals.

The luminance of the outer end pixels 4a1 are corrected in accordance with the first pixel-to-pixel pitch P1 and the second pixel-to-pixel pitch P2, for example. Specifically, the luminance correction processing unit 25 performs the luminance correction processing to increase the luminance of the outer end pixels 4a1 in a case where the difference between the first pixel-to-pixel pitch P1 and the second pixel-to-pixel pitch P2 is large and to reduce the luminance to the normal luminance or less in a case where the difference is small. Accordingly, in the display apparatus 30, it is possible to more effectively make the portions corresponding to the joints 5 inconspicuous even if the difference between the first pixel-to-pixel pitch P1 and the second pixel-to-pixel pitch P2 is large.

Moreover, in the example of the display apparatus 30 shown in FIG. 3, the portion of the array of the pixel-to-pixel pitches satisfies the condition A-2 (the pixel-to-pixel pitches take a gradually larger value toward the outer periphery 6 from the side of the center portion CL). In the example of the display apparatus 30 shown in FIG. 4A or 4B, the array of the pixel-to-pixel pitches satisfies the condition A-2. In a case where the array of the pixel-to-pixel pitches satisfies the condition A-2 in the display apparatus 30 in this manner, it is favorable that in the luminance correction processing unit 25, the luminance of the pixels 4 corresponding to the portion that satisfies the condition A-2 in the array of the pixel-to-pixel pitches is set to the luminance according to the array of the pixel-to-pixel pitches. In this case, the luminance correction processing unit 25 corrects the luminance of the pixels 4 corresponding to the portion that satisfies the condition A-2 in the array of the pixel-to-pixel pitches in the input video signals in accordance with the difference between P(in) and P(out) (difference between the pixel-to-pixel pitches adjacent to each other).

For example, the luminance correction processing unit 25 performs the luminance correction processing to increase the luminance of pixels 4 closer to the outer periphery of the unit panel 6 in accordance with the difference between the pixel-to-pixel pitches adjacent to each other. The predetermined pixels 4 set fourth herein are pixels that constitute the portion that satisfies the condition A-2 in the array of the pixel-to-pixel pitches. By performing such luminance correction processing, it is possible to much more effectively make the portions corresponding to the joints 5 inconspicuous with respect to a video displayed on the screen portion 2 of the display apparatus 30. It should be noted that the luminance of the other pixels as well as the outer end pixels 4a1 may be corrected.

In accordance with the video display method in the display apparatus 30 as described above, it is possible to much more effectively make the portions corresponding to the joints 5 inconspicuous with respect to a video displayed on the screen portion of the display apparatus 30 while it is possible to ensure the joint width, ensure the cut margin during the manufacture of unit panels, and ensure the margin for the lay-out of wirings to be connected to pixels.

It should be noted that although the example in which the luminance correction processing and the video distortion correction processing are performed by the display control unit in the display apparatus has been described above, the input video signals may be signals subjected to the luminance correction processing and the video distortion correction processing in advance. Alternatively, information regarding the pixel-to-pixel pitches and the like may be sent to an apparatus on a cloud from the display apparatus and the luminance correction processing and the video distortion correction processing according to the pixel-to-pixel pitches may be performed by the apparatus on the cloud.

EXAMPLES

Next, examples of the present disclosure will be described. It should be noted that the present disclosure is not limited to the examples to be described below.

Example 1

A display apparatus in which unit panels were disposed as shown in FIGS. 1A and 1B was were prepared. As the unit panels, those having the array of the pixel-to-pixel pitches as shown in FIG. 2 were prepared. Moreover, in the display apparatus, the first pixel-to-pixel pitch was set to 800 μm and the second pixel-to-pixel pitch was set to 700 μm. In accordance with the display apparatus according to Example 1, 260 μm was able to be ensured as the joint width and 270 μm was able to be ensured as the distance between the outer end pixel to the outer periphery of the unit panel, and the joint width, the cut margin during the manufacture of unit panels, and the margin for the lay-out of wirings to be connected to pixels were able to be ensured. A video was displayed on the screen portion of such a display apparatus. It was visually observed that the joints were inconspicuous on the screen portion.

Comparative Example 1

Unit panels having the pixel-to-pixel pitches as shown in FIG. 2 were prepared. In the display apparatus, as in Example 1, the second pixel-to-pixel pitch was set to 700 μm. Setting the first pixel-to-pixel pitch to 700 μm equal to the second pixel-to-pixel pitch, the display apparatus in which the unit panels were disposed as shown in FIGS. 1A and 1B were fabricated. The outer dimension of the unit panel used in Comparative Example 1 was equal to the outer dimension of the unit panel used in Example 1. In the display apparatus according to Comparative Example 1, although the joint width was reduced to 240 μm, only 230 μm was able to be ensured as the distance between the outer end pixel to the outer periphery of the unit panel, and the cut margin and the margin for the wiring lay-out were insufficient.

Example 2

A display apparatus in which unit panels were disposed as shown in FIGS. 1A and 1B were prepared. As the unit panels, those having the array of the pixel-to-pixel pitches as shown in FIG. 3 were prepared. Moreover, in the display apparatus, the first pixel-to-pixel pitch was set to 800 μm and the second pixel-to-pixel pitch was set to 795 μm. The array of the pixel-to-pixel pitches was set so that the pixel-to-pixel pitch was 600 μm to the pixel at the predetermined position outward from the pixel proximate to the center portion of the unit panel and the pixel-to-pixel pitches increased by 5 μm to the outer end pixel from the pixel at the predetermined position. The outer dimension of the unit panel used in Example 2 was equal to the outer dimension of the unit panel used in Example 1.

Example 3

A display apparatus in which unit panels were disposed as shown in FIGS. 1A and 1B were prepared. As the unit panels, those having the array of the pixel-to-pixel pitches as shown in FIG. 4A were prepared. Moreover, in the display apparatus, the first pixel-to-pixel pitch was set to 800 μm and the second pixel-to-pixel pitch was set to 790 μm. The array of the pixel-to-pixel pitches was set so that the pixel-to-pixel pitch between the pixel proximate to the center portion of the unit panel and the pixel adjacent thereto outward was 600 μm, the pixel-to-pixel pitches increased by 5 μm to the pixel at the predetermined position outward from the center portion of the unit panel, and the pixel-to-pixel pitches increased by 10 μm from the pixel at the predetermined position to the outer end pixel. The outer dimension of the unit panel used in Example 3 was equal to the outer dimension of the unit panel used in Example 1.

Example 4

A display apparatus in which unit panels were disposed as shown in FIGS. 1A and 1B were prepared. As the unit panels, those having the array of the pixel-to-pixel pitches as shown in FIG. 4B were prepared. Moreover, in the display apparatus, the first pixel-to-pixel pitch was set to 800 μm and the second pixel-to-pixel pitch was set to 795 μm. The array of the pixel-to-pixel pitches was set so that the pixel-to-pixel pitches increased by 5 μm to the outer end pixel outward from the center portion of the unit panel. The outer dimension of the unit panel used in Example 4 is smaller than the outer dimension of the unit panel used in each of Examples 1 to 3.

In accordance with the display apparatus according to each of Examples 2 to 4, as in Example 1, 260 μm was able to be ensured as the joint width, 270 μm was able to be ensured as the distance between the outer end pixel to the outer periphery of the unit panel, and the joint width, the cut margin during the manufacture of unit panels, and the margin for the lay-out of wirings to be connected to pixels were able to be ensured. Moreover, the difference between the first pixel-to-pixel pitch and the second pixel-to-pixel pitch of the display apparatus according to each of Examples 2 to 4 is smaller than the display apparatus according to Example 1, and the joints were not visually observed on the screen portion when displaying a video on the screen portion of the display apparatus, and the joints were able to be made more inconspicuous than in Example 1.

Examples 5 to 8

In Examples 5, 6, 7, and 8, the display apparatuses according to Examples 1, 2, 3, and 4 were used respectively in order and the input video signals were subjected to the luminance correction processing. The luminance correction processing was performed in accordance with the above-mentioned method in the video display method in the display apparatus. A video was displayed on the screen portion of such a display apparatus. The joints were not able to be visually observed on the screen portion, and the joints were inconspicuous on the screen portion.

Modified Example

Although the embodiment of the present disclosure has been specifically described above, the contents of the present disclosure are not limited to the above-mentioned embodiment, and various modifications based on the technical ideas of the present disclosure can be made.

Although the tiling display using the LEDs as the light-emitting elements has been described as an example of the display apparatus, the display apparatus is not limited thereto. For example, the display apparatus may be a display apparatus using liquid crystal or organic electronic luminescence (EL) as the light-emitting elements.

The order of the processing performed in the display control unit of the display apparatus can be changed as appropriate.

It should be noted that the contents of the present disclosure should not be interpreted to be limited by the effects exemplified in the present disclosure.

The present disclosure can also take the following configurations.

(1) A display apparatus, including
a screen portion in which unit panels in which a plurality of pixels formed from light-emitting elements is disposed are arranged, in which
a first pixel-to-pixel pitch that is a space between two outer end pixels adjacent to each other across outer peripheries of the unit panels is equal to or larger than a second pixel-to-pixel pitch that is a space between each of the outer end pixels in each of the unit panels and a pixel adjacent to the outer end pixel, and
the pixel-to-pixel pitches adjacent to each other in the array of the pixel-to-pixel pitches in a direction in which the first pixel-to-pixel pitch and the second pixel-to-pixel pitch are arranged in the unit panel are set to be P(in)≤P(out) where P(in) denotes the pixel-to-pixel pitch located on a central side of the unit panel and P(out) denotes the pixel-to-pixel pitch located on an outer peripheral side of the unit panel.

(2) The display apparatus according to (1), in which setting to be P(in)<P(out) is performed.

(3) The display apparatus according to (2), in which
a difference between the P(in) and the P(out) is set to be constant.

(4) The display apparatus according to any one of (1) to (3), in which
the unit panel has pixels disposed in a matrix form.

(5) The display apparatus according to any one of (1) to (4), in which
the screen portion has a plurality of unit panels combined in a tile form.

(6) The display apparatus according to any one of (1) to (5), in which
the light-emitting element is a light-emitting diode.

(7) The display apparatus according to any one of (1) to (6), in which
the screen portion is provided with an anti-glare film having irregularities on a surface, and
on a surface side of the anti-glare film, an anti-reflection film containing particles is stacked.

(8) The display apparatus according to any one of (1) to (7), further including
a luminance correction processing unit that corrects luminance of the outer end pixels provided in the unit panels.

(9) The display apparatus according to (8), in which
the luminance correction processing unit sets the luminance of the outer end pixels to a value according to the first pixel-to-pixel pitch and the second pixel-to-pixel pitch.

(10) The display apparatus according to (8), in which
the luminance correction processing unit sets the luminance of the outer end pixels to a value according to a difference between the P (in) and the P(out).

(11) The display apparatus according to (2), further including
a video distortion correction processing unit that corrects a video distortion, the video distortion being generated in an input video signal due to setting the pixel-to-pixel pitches to be P(in)<P(out).

(12) The display apparatus according to (11), in which
the video distortion correction processing unit corrects a video distortion in accordance with a difference between the P (in) and the P(out).

(13) A video display method in a display apparatus including a screen portion in which unit panels in which a plurality of pixels formed from light-emitting elements is disposed are arranged, in which a first pixel-to-pixel pitch that is a space between two outer end pixels adjacent to each other across outer peripheries of the unit panels is equal to or larger than a second pixel-to-pixel pitch that is a space between each of the outer end pixels in each of the unit panels and a pixel adjacent to the outer end pixel, and the pixel-to-pixel pitches adjacent to each other in the array of the pixel-to-pixel pitches in a direction in which the first pixel-to-pixel pitch and the second pixel-to-pixel pitch are arranged in the unit panel are set to be P(in)<P(out) where P(in) denotes the pixel-to-pixel pitch located on a central side of the unit panel and P(out) denotes the pixel-to-pixel pitch located on an outer peripheral side of the unit panel, the method including:
correcting, by a video distortion correction processing unit, a video distortion, the video distortion being generated in an input video signal due to setting the pixel-to-pixel pitches to be P(in)<P(out); and
changing, by a luminance correction processing unit, luminance of the outer end pixels provided in the unit panels.

REFERENCE SIGNS LIST 1 unit panel
2 screen portion
3 panel substrate
4, 4a2, 4b, 4c, 4d pixel
4a1 outer end pixel
5 joint
6 outer periphery of unit panel
10 anti-glare film
11 film base material
12 anti-glare layer
13 anti-reflection film
14 particle
20 display control unit
21 input frame buffer
22 video distortion correction processing unit
23 output frame buffer
24 linear and gamma correction unit
25 luminance correction processing unit
26 luminance and chromaticity non-uniformity correction unit
27 video signal input unit
30 display apparatus
31 base
41 light-emitting element

The invention claimed is:

1. A display apparatus, comprising:
a screen portion that includes a plurality of unit panels, wherein
  each of the plurality of unit panels includes a plurality of pixels having light-emitting elements, the plurality of pixels comprises outer end pixels at an outer periphery of each of the plurality of unit panels,
  a first pixel-to-pixel pitch that corresponds to a space between a first outer end pixel and a second outer end pixel adjacent to the first outer end pixel across outer peripheries of a first unit panel and a second unit panel adjacent to the first unit panel, respectively, is equal to or larger than a second pixel-to-pixel pitch that corresponds to a space between each of the outer end pixels and a pixel adjacent to a respective outer end pixel in each of the plurality of unit panels, and
  adjacent pixel-to-pixel pitches, in an array of pixel-to-pixel pitches in a direction in which the first pixel-to-pixel pitch and the second pixel-to-pixel pitch are arranged in each of the plurality of unit panels, are set to be P(in)≤P(out), where P(in) denotes a pixel-to-pixel pitch located on a central side of each of the plurality of unit panels and P(out) denotes a pixel-to-pixel pitch located on an outer peripheral side of each of the plurality of unit panels; and
a video distortion correction processing unit configured to correct a video distortion in an input video signal due to the adjacent pixel-to-pixel pitches set to be P(in)<P(out), wherein the correction of the video distortion is in accordance with a difference between the P(in) and the P(out).

2. The display apparatus according to claim 1, wherein the adjacent pixel-to-pixel pitches are set to be P(in)<P(out) during a manufacture of the display apparatus.

3. The display apparatus according to claim 2, wherein the difference between the P(in) and the P(out) is set to be constant.

4. The display apparatus according to claim 1, wherein each of the plurality of unit panels has the plurality of pixels disposed in a matrix form.

5. The display apparatus according to claim 1, wherein the screen portion has the plurality of unit panels combined in a tile form.

6. The display apparatus according to claim 1, wherein each of the light-emitting elements is a light-emitting diode.

7. The display apparatus according to claim 1, wherein
  the screen portion comprises an anti-glare film having irregularities on a surface, and
  on a surface side of the anti-glare film, an anti-reflection film containing particles is stacked.

8. The display apparatus according to claim 1, further comprising a luminance correction processing unit configured to correct luminance of the outer end pixels provided in the plurality of unit panels.

9. The display apparatus according to claim 8, wherein the luminance correction processing unit is further configured to set the luminance of the outer end pixels to a value according to the first pixel-to-pixel pitch and the second pixel-to-pixel pitch.

10. The display apparatus according to claim 8, wherein the luminance correction processing unit is further configured to set the luminance of the outer end pixels to a value according to the difference between the P(in) and the P(out).

11. A video display method, comprising:
in a display apparatus including a screen portion, wherein the screen portion includes a plurality of unit panels in which a plurality of pixels formed from light-emitting elements is disposed, wherein
  the plurality of pixels comprises outer end pixels at an outer periphery of each of the plurality of unit panels,
  a first pixel-to-pixel pitch that corresponds to a space between a first outer end pixel and a second outer end pixel adjacent to the first outer end pixel across outer peripheries of a first unit panel and a second unit panel adjacent to the first unit panel, respectively, is equal to or larger than a second pixel-to-pixel pitch that corresponds to a space between each of the outer end pixels and a pixel adjacent to a respective outer end pixel in each of the plurality of unit panels, and
  adjacent pixel-to-pixel pitches, in an array of pixel-to-pixel pitches in a direction in which the first pixel-to-pixel pitch and the second pixel-to-pixel pitch are arranged in each of the plurality of unit panels, are set to be P(in)<P(out), where P(in) denotes a pixel-to-pixel pitch located on a central side of each of the plurality of unit panels and P(out) denotes a pixel-to-pixel pitch located on an outer peripheral side of each of the plurality of unit panels:
correcting, by a video distortion correction processing unit, a video distortion in an input video signal due to setting the adjacent pixel-to-pixel pitches to be P(in)<P(out), wherein the correction of the video distortion is in accordance with a difference between the P(in) and the P(out); and
changing, by a luminance correction processing unit, luminance of the outer end pixels in each of the plurality of unit panels.

* * * * *